(No Model.)
T. S. MILLER.
BICYCLE BRAKE.
No. 587,104.        Patented July 27, 1897.
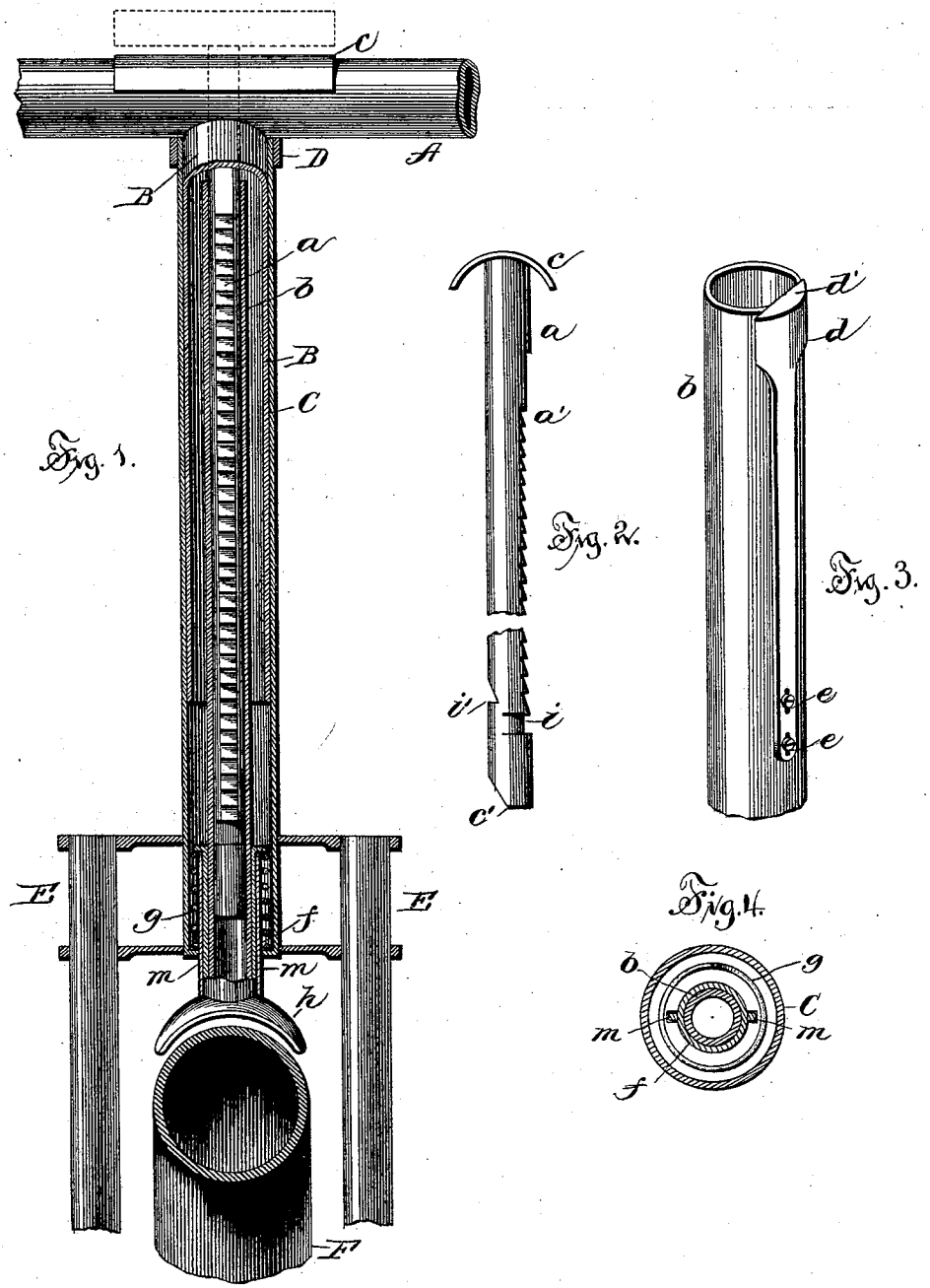
Witnesses:
J. M. Fowler
Jno. B. Bloss
Inventor:
Thomas S. Miller, by
Henry H. Bates
his Attorney.
THE NORRIS PETERS CO., PHOTO-LITHO., WASHINGTON, D. C.

UNITED STATES PATENT OFFICE.

THOMAS S. MILLER, OF BURLINGTON, IOWA.

BICYCLE-BRAKE.

SPECIFICATION forming part of Letters Patent No. 587,104, dated July 27, 1897.

Application filed January 9, 1897. Serial No. 618,595. (No model.)

*To all whom it may concern:*

Be it known that I, THOMAS S. MILLER, a citizen of the United States, residing at Burlington, in the county of Des Moines and State of Iowa, have invented certain new and useful Improvements in Adjustable Plunger-Brakes for Bicycles; and I do hereby declare the following to be a full, clear, and exact description of the invention, such as will enable others skilled in the art to which it appertains to make and use the same.

My invention has reference to an improvement in plunger-brakes for bicycles and similar vehicles; and it consists in a device whereby the brake is made very light and ordinarily unobserved, while capable of being instantly adjusted for use while riding and returned to place without dismounting when the danger is passed.

Said invention is designed, primarily, to be applied to that class of bicycles in which the handle-bar is capable of adjustment as to height while riding—as, for example, in my former patent, No. 570,179, dated October 27, 1896—but it may also be applied to bicycles of ordinary form and style.

In the drawings forming a part of this specification, Figure 1 is an elevation, partly in section, of a fork-stem of the adjustable species above referred to with such portions of the handle-bar, fork, and pneumatic tire as may be necessary for illustration and showing my adjustable plunger-brake in position, also partly in section. Fig. 2 is a side view of the extensible brake-rod and its handle, broken away in the center. Fig. 3 is a view in perspective of the upper portion of the tubular brake-shaft which coöperates with the aforesaid brake-rod, carrying the spoon-formed spring click or pawl affixed to its side. Fig. 4 is a transverse sectional view near the bottom of the fork-stem, showing the sustaining-spring and the splines and splineways.

Like letters refer to like parts upon the several figures of the drawings.

In the said drawings, A indicates a portion of the handle-bar, of usual form.

B is the handle-bar post, permanently secured to the handle-bar.

C is the fork-stem; D, the clamping-ring employed in that class of bicycles which have extensible posts.

E is the fork, and F a portion of the pneumatic tire.

Referring to the brake mechanism, $a$ is the extensible brake-rod, having ratchet-teeth on its front face, (marked $a'$.) $b$ is the tubular brake-shaft surrounding and coöperating with the said brake-rod. $c$ is the brake-handle. (Shown also in dotted lines when in elevated position.) $d$, Fig. 3, is the spoon-formed pawl attached to the tubular brake-shaft $b$, having click projection or lip $d'$. $e$ $e$ are elongated slots, which permit of longitudinal motion of the said pawl, described below. $f$ is a reinforce applied to the brake-shaft $b$ at its lower extremity. $g$ is the supporting-spring. $h$ is the brake-shoe, and $m$ $m$ are the splines which prevent the brake-shaft from turning.

The prime object of my device is to provide a brake for bicycles which may be made so light and so concealed as to do away with the objections often urged against brakes by wheelmen, the handle of my brake being ordinarily out of sight, as it lies close against the top of the handle-bar until needed for an emergency, when it can be instantly raised by the rider to operative position when approaching a dangerous place and readily restored to place without stopping. It is also simple in construction, much lighter than ordinary brakes, and sure and safe in operation, the force being readily applied by direct pressure without the intervention of leverage. The plunger shaft and rod may be within the stem, as illustrated, or located just outside, the operation being in both cases the same.

Another valuable feature is that the device can be applied to bicycles having the adjustable and extensible handle-bar post before referred to equally as well as to those of ordinary construction.

When the extensible post is used, (shown in Fig. 1,) it is designed to be moved vertically to the required height and then fixed in place by the clamping-ring D, shown in section. To accommodate this feature, the ratcheted bar $a$ is shown of extreme length. Referring to the adjustable brake device proper, the handle $c$, which is made ordinarily of thin sheet metal curved to fit the handle-bar, lies closely upon the upper side of the latter when out of use, so as to be unobserved. I usually line the same with felt or similar material to prevent rattling. The said handle is connected to the ratcheted brake-rod $a$, which extends down through holes in the upper and lower sides of the handle-bar when the brake-rod is arranged inside of the fork-stem. The upper hole in the handle-bar is usually fitted with a compressed leather washer for the purpose of preventing rattling. The said brake-rod $a$ is flattened on its front side from near its lower end to within a short distance from its upper end, say about the diameter of the handle-bar. This flattened surface is provided throughout nearly its whole length with ratchet-teeth $a'$, a sufficient clearance being left at the top to provide for replacement. These teeth are located a suitable distance apart, say about one-fourth of an inch, the inclination being directed downward, as shown. They are also made to have a slightly-inclined hold, as is usual with ratchet-teeth, and this is useful in tending to prevent the brake-rod from turning when in use. At the lower end of the ratcheted face is formed a notch $i$, and on the rear of the brake-rod about one-half an inch higher is formed a notch $i'$ to limit any direct upward motion of rod $a$ during adjustment while riding. Said rod $a$ is also beveled at its lower end at the rear, as at $c$, to enable it to be more readily inserted in its place by reversing it, thus enabling the rod to readily pass the pawl-lip $d'$, described below.

The brake-rod $a$ lies within and coöperates with a tubular brake-shaft $b$, so as to move easily therein. This brake-shaft carries at its lower extremity the brake-shoe $h$. It extends through a hole in the closed lower end of fork-stem C and upward nearly to the upper end of the said stem, as shown. Said brake-shaft is reinforced at its lower end by a tubular reinforce $f$. A spring $g$ surrounds and sustains the tubular brake-shaft at its lower end and may be a spring of any known form or material suitable for the purpose. Splines $m$ $m$ are provided, which play in recesses formed in the floor of the tubular fork-stem.

At the upper end of the tubular brake-shaft $b$ is located a spring click or pawl $d$, attached to the front side thereof by any well-known means, as studs and slots, but so as to be capable of longitudinal movement for reasons presently to be explained. I have shown it attached by screw-bolts with elongated slots or holes, capable of the said longitudinal movement. Said spring-pawl is concave or spoon-shaped in form and has a lip $d'$, which projects over and normally rests upon the top of the tubular shaft $b$. This lip $d'$ is the element that engages with the ratchet-teeth $a'$ of the brake-rod $a$ in order to sustain the latter when in the extended position required for application of the brake. The said lip $d'$ is inclined slightly upward on its upper surface, so as to meet the ratchet-teeth at an acute angle and thus gain the hold before mentioned, which tends to prevent the brake-rod from turning.

The stem of the spring-pawl is attenuated, as shown, to give it the spring function, and the elongated holes $e$ $e$ are for the purpose of preventing the weight of the ratcheted brake-rod and the brake-handle, as well as the whole brake-pressure, from coming directly on the attaching means, which would soon weaken and eventually dislodge the spring-pawl from its place. If the pawl were rigidly attached to the shaft $b$ by the screw-bolts or rivets, the overhanging lip $d'$ would not at all times be sure of resting firmly on the top of the tubular shaft $b$, and some play which does not interfere with its function is therefore allowed in the same attachment, as above described. By this provision the weight of the brake-rod and the pressure on the handle is borne upon the top of the brake-shaft and no injury can occur. The vertical play of the brake-shaft $b$ is ordinarily about one inch, which is found to be sufficient for the purpose, and the said brake-shaft is sustained by spring $g$, as before said, or equivalent means, so as to hold the brake-shoe out of action until force is applied. Splines or feathers $m$ $m$ are supplied on the tubular brake-shaft or its reinforce at the lower extremity to prevent its turning in its place, and these play within conveniently-arranged ways or apertures at the sides of the opening in the floor of fork-stem C, in a manner which will be clearly understood by a skilled mechanic without more elaborate description.

In operation this brake will ordinarily be carried with its handle $c$ resting upon the upper surface of the handle-bar, as shown in Fig. 1, and being of similar material and of the same style of finish as the handle-bar will not be noticeable. When approaching a dangerous place, the rider in preparation for use will raise the handle to the position shown in the dotted lines, Fig. 1, which will bring a tooth of ratchet $a'$ upon lip $d'$ of spring-pawl $d$, after which the brake may be applied at pleasure by pressing down upon the said handle $c$, pressure being conveniently applied by placing the base of the thumb of either hand upon the said handle and two fingers beneath the handle-bar at the side of the fork-stem, or both hands may be used, if necessary. When this brake is used with an extensible handle-bar post, as in my former patent before mentioned, the brake-handle will be raised with the handle-bar, and when the said handle-bar is dropped the brake may be left standing, if desired, or returned to place in the manner hereinafter described, the same as in an ordinary style of handle-bar post. The handle $c$ is returned to carrying position by turning it a quarter of the way round, so that the pawl-click $d'$ is disengaged from the ratchet-teeth and bears against the smooth side of the brake-rod $a$. The handle can then be pressed down without difficulty, and the upper tooth of the ratchet-face being lower than lip $d'$ the said rod can be turned back to former position and returned to place in contact with the handle-bar, the lip of the pawl sliding freely over the smooth surface of the rod above the ratchet-teeth, or the handle $c$ may be turned half-way round and returned to place, in which case it will require reversal when again brought into use.

The handle $c$ may be of any other shape than that shown, if desired, as some may prefer an ornamental knob.

When it is preferred to locate the brake rod and shaft outside the tubular stem instead of inside, as shown, suitable guides will be provided, and a finger-grip may be supplied to coöperate with the handle in place of using the handle-bar for a finger-grip in case the handle should by preference be located in front of the handle-bar instead of directly above the same.

I claim and desire to secure by Letters Patent—

1. A plunger-brake for bicycles and similar vehicles, which is adjustable while riding, consisting of a brake-shoe, a plunger-handle independent of the handle-bar, and an extensible rod and shaft connecting the said brake-shoe and handle, with means for automatically catching and retaining the said connection in any required position of extension, substantially as specified.

2. In an adjustable plunger-brake for bicycles, a brake-shoe, a tubular brake-shaft connected thereto, a handle independent of the handle-bar, a brake-rod connected to the said handle and moving easily within the said brake-shaft, ratchet-teeth upon the said brake-rod, and a spring-pawl secured to the said brake-shaft at its upper end, coöperating with the said ratchet-teeth whereby the extensible rod is maintained in the extended position, substantially as specified.

3. In an adjustable plunger-brake, the combination of the independent handle, the ratcheted brake-rod, the tubular brake-shaft, the spring-pawl secured on the said brake-shaft, the brake-shoe, and a spring at the lower extremity of the said brake-shaft whereby the brake-shoe is normally held out of contact with the wheel-tire, substantially as specified.

4. In an adjustable plunger-brake for bicycles, an adjustable plunger-handle midway between the steering-handles, an extensible and adjustable telescopic rod and shaft with means for automatically catching and retaining them in any required position of extension when adjusted, a brake-shoe, a spring for sustaining the brake shaft and rod, and splines $m\ m$ for preventing the said brake-shaft from turning, substantially as specified.

5. In an adjustable plunger-brake for bicycles, an adjustable plunger-handle midway of the handle-bar, concaved to fit and lie closely upon the same when not in use, a brake-shoe, an extensible and adjustable telescopic connection between said brake-shoe and said handle with means for automatically catching and retaining the same in any desired position of extension when adjusted, a supporting-spring for the said brake-shaft, and a spline for preventing the brake-shaft from turning, substantially as specified.

6. In an adjustable plunger-brake the combination of the concaved plunger-handle, the elongated ratcheted brake-rod having notches $i\ i'$, and beveled end $c'$, the tubular brake-shaft extending nearly to the top of the fork-stem, the spring-pawl attached to the said brake-shaft at the top by an adjustable connection, the sustaining-spring, means for preventing the brake-shaft from turning, and brake-shoe, all substantially as specified.

In testimony whereof I affix my signature in presence of two witnesses.

THOMAS S. MILLER.

Witnesses:
NEAL WILKIN,
J. H. WILKIN.